(12) United States Patent  
Cabillic et al.

(10) Patent No.: US 8,806,459 B2  
(45) Date of Patent: Aug. 12, 2014

(54) JAVA STACK MACHINE EXECUTION KERNEL DYNAMIC INSTRUMENTATION

(75) Inventors: Gilbert Cabillic, Brécé (FR); Jean-Philippe Lesot, Argentré du Plessis (FR)

(73) Assignee: Texas Instruments Incorporated, Dallas, TX (US)

( * ) Notice: Subject to any disclaimer, the term of this patent is extended or adjusted under 35 U.S.C. 154(b) by 1495 days.

(21) Appl. No.: 11/956,146

(22) Filed: Dec. 13, 2007

(65) Prior Publication Data

US 2009/0089550 A1 Apr. 2, 2009

(30) Foreign Application Priority Data

Sep. 28, 2007 (EP) .................................. 07291170

(51) Int. Cl.  
*G06F 9/45* (2006.01)

(52) U.S. Cl.  
USPC ........................................................... 717/148

(58) Field of Classification Search  
USPC ........................................................... 717/148  
See application file for complete search history.

(56) References Cited

U.S. PATENT DOCUMENTS

| | | | |
|---|---|---|---|
| 5,754,845 A * | 5/1998 | White | 717/147 |
| 6,941,545 B1 * | 9/2005 | Reese et al. | 717/130 |
| 7,225,436 B1 * | 5/2007 | Patel | 717/139 |
| 2004/0163077 A1 * | 8/2004 | Dimpsey et al. | 717/130 |
| 2005/0114848 A1 * | 5/2005 | Choi et al. | 717/148 |
| 2007/0168998 A1 * | 7/2007 | Mehta et al. | 717/130 |
| 2008/0134242 A1 * | 6/2008 | Klosterman | 725/44 |

OTHER PUBLICATIONS

Formanek, Ian et al., "Dynamic Bytecode Instrumentation: A new way to profile Java applications," Dr. Dobb's Portal, Feb. 1, 2006, 11 pages, Found at: http://www.ddj.com/dept/java/184406433.

\* cited by examiner

*Primary Examiner* — Ryan Coyer

(74) *Attorney, Agent, or Firm* — Ronald O. Neerings; Frederick J. Telecky

(57) ABSTRACT

A method and system for performing dynamic instrumentation. At least some of the illustrative embodiments are methods comprising setting at least one monitor value (wherein the at least one monitor value is associated with a software monitoring handler), detecting a value within a register equal to the at least one monitor value, and executing the software monitoring handler based on the detecting.

17 Claims, 4 Drawing Sheets

JAVA STACK MACHINE EXECUTION KERNEL DYNAMIC INSTRUMENTATION

CROSS-REFERENCE TO RELATED APPLICATION

The present application claims priority to EP Application No. 07291170.4, filed on Sep. 28, 2007, hereby incorporated herein by reference.

BACKGROUND

Java™ is a programming language that, at the source code level, is similar to object oriented programming languages such as C++. Java™ language source code is compiled into an intermediate representation based on a plurality "bytecodes" that define specific tasks. In some implementations, the bytecodes are further compiled to machine language for a particular processor. In order to speed the execution of Java™ language programs, some processors are specifically designed to execute some of the Java™ bytecodes directly.

Many times, a processor that directly executes Java™ bytecodes is paired with a general purpose processor so as to accelerate Java™ program execution in a general or special purpose machine. It would be advantageous to provide accelerations, similar to those seen for directly executed Java™ bytecodes, in other languages and development environments.

Also, it is often useful to monitor the execution of a software application for a variety of purposes, such as Dynamic Adaptive Compilation ("DAC") hotspot detection, memory profiling, or to determine how often certain pieces of code are executed. Such application monitoring may be implemented by instrumentation of the software application code. Various implementations of code instrumentation result in code expansion and may call for changes in a Java™ platform used to execute the Java™ bytecodes. Thus, it would be desirable to provide more efficient code instrumentation that is not subject to code expansion and/or other drawbacks resulting from modification of the Java™ platform.

SUMMARY

The problems noted above are solved in large part by a method and system for performing dynamic instrumentation. At least some of the illustrative embodiments are methods comprising setting at least one monitor value (wherein the at least one monitor value is associated with a software monitoring handler), detecting a value within a register equal to the at least one monitor value, and executing the software monitoring handler based on the detecting.

Other illustrative embodiments are processors comprising fetch logic that retrieves instructions from memory, decode logic coupled to the fetch logic, and an active program counter comprising a value. The processor monitors the active program counter value during execution of an application, and when the active program counter value reaches a predetermined value, the processor executes a software monitoring handler.

BRIEF DESCRIPTION OF THE DRAWINGS

For a more detailed description of the various embodiments, reference will now be made to the accompanying drawings, wherein.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device, such as a processor. The processor described herein may be particularly suited for executing Java™ Bytecodes, or comparable code. Java is particularly suited for embedded applications and is a relatively "dense" language meaning that, on average, each instruction may perform a large number of functions compared to various other programming languages. The dense nature of Java is of particular benefit for portable, battery-operated devices. The reason, however, for executing Java code is not material to this disclosure or the claims that follow. Further, the various embodiments may be described in the context of Java, but should not be limited to the execution of only Java instructions. The processor described herein may be used in a wide variety of electronic systems (e.g., cell phones).

Figure 1:
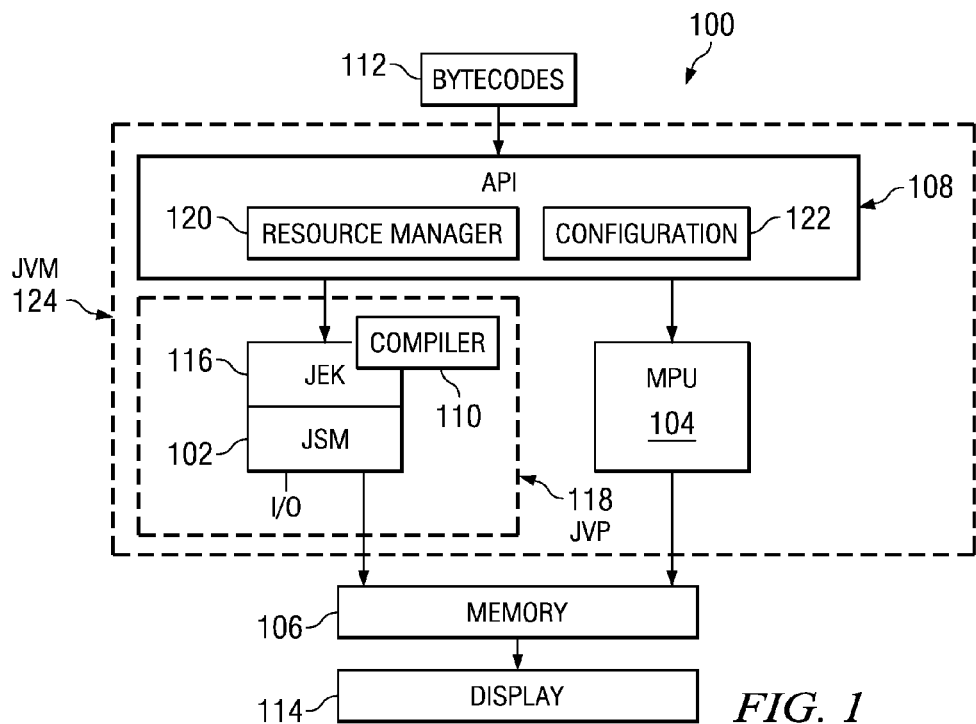
FIG. 1 shows a diagram of a system in accordance with embodiments of the invention comprising a Java Stack Machine ("JSM")

FIG. 1 illustrates a system 100 in accordance with at least some embodiments. In particular, the system 100 comprises at least one processor 102. Processor 102 is referred to for purposes of this disclosure as a Java Stack Machine ("JSM") 102. The JSM 102 comprises an interface to one or more input/output ("I/O") devices such as a keypad to permit a user to control various aspects of the system 100. In addition, data streams may be received from the I/O space into the JSM 102 to be processed by the JSM 102.

Optional processor 104 may be referred to as a Micro-Processor Unit ("MPU"). System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise an Application Programming Interface implementation (API) 108 and a Java Virtual Processor (JVP) 118 (discussed more below). The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel (JEK) 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 116, possibly compiled by compiler 110, and provided to the JSM 102. When appropriate, the JVP 118 may direct some method execution to the MPU 104.

The MPU 104 also may execute non-Java instructions. For example, the MPU 104 may host an operating system (O/S) which performs various functions such as system memory management, system task management and most or all other native tasks running on the system, management of the display 114, and receiving input from input devices. Java code, executed on the JVP 118, may be used to perform any one of a variety of applications such as multimedia, games or web based applications in the system 100, while non-Java code, which may comprise the O/S and other native applications, may run on the MPU 104.

Most Java™ bytecodes perform stack-based operations. For example, an "IADD" (integer add) Java™ opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses within the JVM or JEK data structure for various verifications (e.g., NULL pointer, array boundaries) are made.

The JSM processor 102 in accordance with some embodiments may execute, in addition to the Java™ bytecodes, a second instruction set other than Java™ bytecodes. In some exemplary embodiments, the second instruction set may comprise register-based and memory-based operations rather than stack based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions. The execution of Java™ code may thus be made more efficient and run faster by replacing some opcodes by more efficient micro-sequences of C-ISA instructions. The JSM 102 thus comprises a stack-based architecture for direct execution of Java™ bytecodes, combined with a register-based architecture for direct execution of memory based micro-sequences of C-ISA instructions. Because various data structures may be JVM dependent, and thus may change from one JVM implementation to another, the software flexibility of the micro sequence provides a mechanism for various JVM optimizations now known or later developed.

As discussed above, the JVP 118 provides a layer of abstraction. In particular, the JVP 118 is a virtual hardware platform that is compatible with any Java API, any real hardware/software platform that may comprise a JSM processor, or any JVM implementation. In some exemplary embodiments, the JVP 118 comprises a JEK core that has an execution engine, a memory management component, and a compiler. The execution engine may comprise a Bytecode engine, a class loader, a notification manager, and an external method interface. The memory management component may comprise a memory allocator, an object mapper for physically constrained objects, a garbage collector, a memory defragmentor, and a swapper. The compiler may comprise a dynamic compiler and provide code buffer management. The JEK core may also comprise firmware to facilitate the execution of Java Bytecodes on the JSM processor.

In embodiments of the present invention, some C-ISA instructions (micro-sequences) may comprise software monitoring handlers useful for monitoring of software applications via code instrumentation (discussed below). In such cases, Java™ bytecodes may not be replaced (as described above), but may instead have their execution suspended while a software monitoring handler is executed. As discussed further below, code instrumentation utilizing software monitoring handlers executes faster and more efficiently than other approaches to code instrumentation in the related art.

The JVP 118 also provides the API 108 with methods to create software class loaders. A class loader loads classes used by an application at runtime. Other hardware components of the hardware platform or software components are virtualized within the JEK 116 as Java Virtual Devices (JVD) that communicate with the JEK core. Each JVD comprises some combination of fields, methods, and notifications. The fields may comprise standard Java fields or may be mapped to a predefined or constrained physical memory space, wherein the constraint may be due to hardware or software. The fields may also comprise a map to indirect memories. The methods may comprise standard bytecodes or may comprises JSM native code, hardware instructions, or may use any kind of native interface such as a Java Native Interface (JNI) or a KVM Native Interface (KNI). The notifications may be initiated by an event, for example, a hardware interrupt, or from software. Additionally, the JEK core manages native interface links and the notification mechanism provides a way to implement flexible monitoring.

Figure 2:
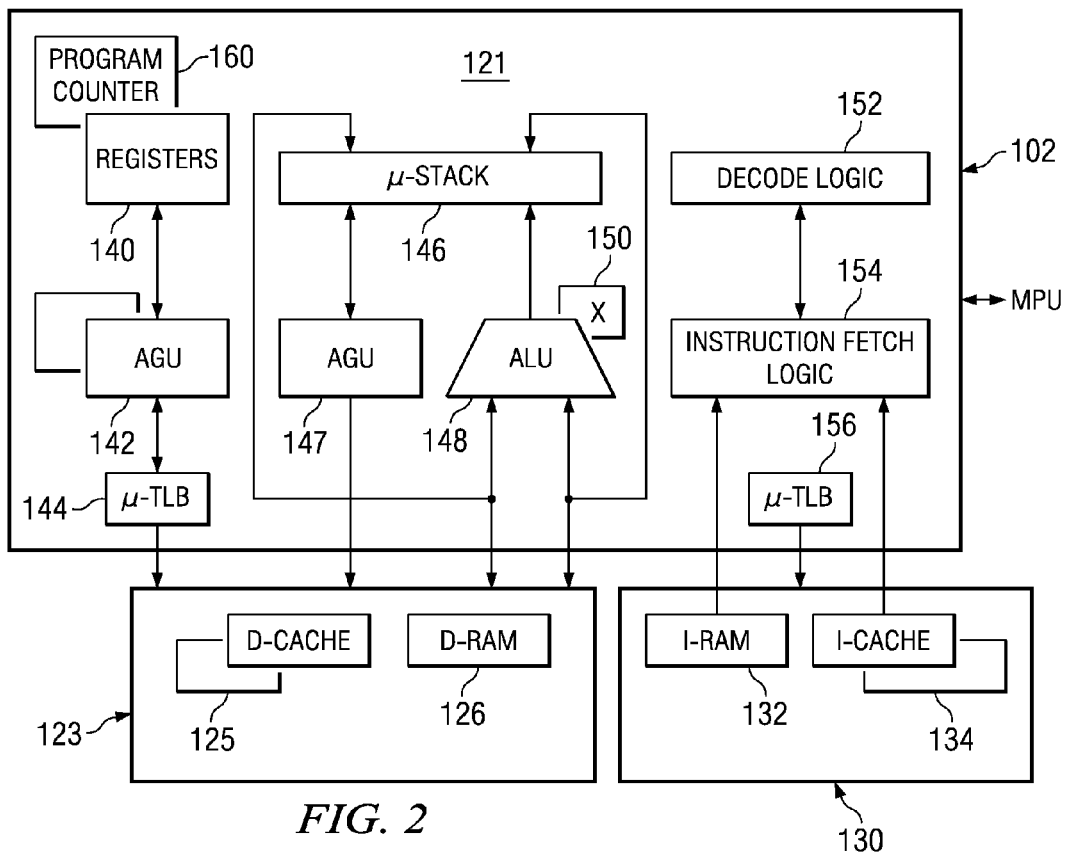
FIG. 2 shows a block diagram of the JSM of FIG. 1.

FIG. 2 shows an illustrative block diagram of the JSM 102 that executes the JEK 116 software, as described above. As shown, the JSM comprises a core 121 coupled to data storage 123 and instruction storage 130. The components of the core 121 may comprise a plurality of registers 140 such as a program counter 160, address generation units ("AGUs") 142 and 147, micro translation lookaside buffers (micro TLBs) 144 and 156, a multi entry micro stack 146, an arithmetic logic unit ("ALU") 148, a multiplier 150, decode logic 152, and instruction fetch logic 154. Data pointed to by operands of opcodes may be retrieved from data storage 123, from the micro stack 146, or from the registers 140 and processed by the ALU 148. Instructions pointed to by the program counter 160 may be fetched from instruction storage 130 by fetch logic 154 and decoded by decode logic 152. The AGUs 142 may be used to calculate addresses based, at least in part, on data contained in the registers 140. AGU 147 couples to the micro stack 146 and may manage overflow and underflow conditions in the micro stack 146. The micro-TLBs 144 and 156 perform the function of a cache for the address translation and memory protection information bits that may be under the control of the operating system running on the MPU 104.

Java™ bytecodes may pop data from and push data onto the micro-stack 146, which micro-stack 146 comprises a plurality of gates in the core 121 of the JSM 102. The micro-stack 146 comprises the top x entries of a larger stack that is implemented in data storage 123. Although the value of x may be vary in different embodiments, in accordance with at least some embodiments the size x of the micro-stack may be the top eight entries in the larger, memory-based stack. By implementing the micro-stack 146 hardware in the core 121 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 123 comprises data cache ("D-cache") 125 and data random access memory ("D-RAM") 126. The stack (excluding the micro stack 146), arrays and non-critical data may be stored in the D-cache 125, while local variables and data may be stored in D-RAM 126. The instruction storage 130 may comprise instruction RAM ("I-RAM") 132 and instruction cache ("I-Cache") 134. The I-RAM 132 may be used for opcodes or micro-sequences, and the I-Cache 134 may be used to store other types of Java™ bytecode and mixed Java™/C-ISA instructions.

Figure 3:
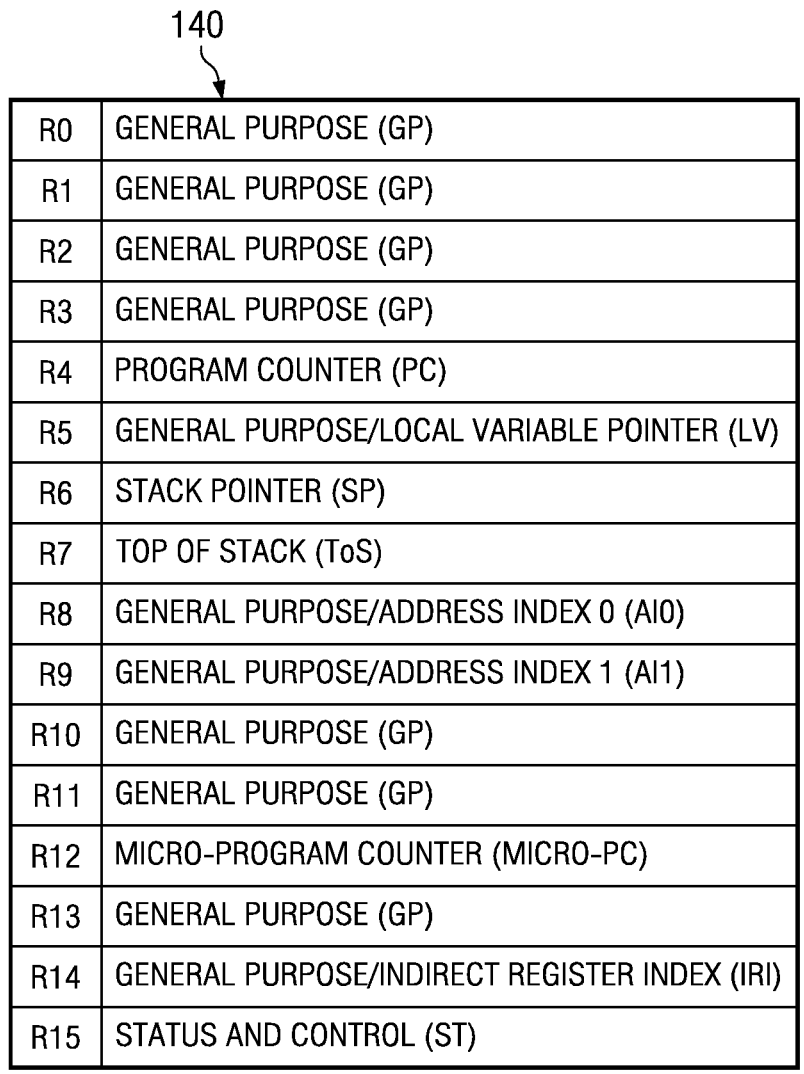
FIG. 3 shows various registers used in the JSM of FIGS. 1 and 2.

Referring now to FIG. 3, the registers 140 (of FIG. 2) may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for executing micro sequences. In addition to use as a GP register, register R5 may be used to store the base address of a portion of memory in which Java™ local variables may be stored when used by a Java™ method. The top of the micro stack 146 can be referenced by the values in registers R6 and R7, and the top of the micro stack may have a matching address in external memory pointed to by register R6. The values contained in the micro-stack are the latest updated values, while their corresponding values in external memory may or may not be up to date. Register R7 provides the data value stored at the top of the micro stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-Sequence-Active" bit, not specifically shown) in status register R15 is used to indicate whether the JSM 102 is executing by way of a micro sequence. This bit controls, in particular, which program counter is used (R4 (PC) or R12 (micro PC)) to fetch the next instruction.

In accordance with some exemplary embodiments, it may be useful to monitor the execution of an application for a variety of purposes, such as Dynamic Adaptive Compilation ("DAC") hotspot detection, memory profiling, or to determine how often certain pieces of code are executed. Monitoring of the application may be implemented by instrumentation of the application code. Various approaches to code instrumentation in the related art result in code expansion and may call for changes to the JVM. Some examples from the related art include code rewriting and relocation, creating a full JVM instrumented interpretation loop (which calls for two interpreters), or creating an instrumented version of the original code and executing it by modifying the JVM interpretation loop.

Figure 4A:
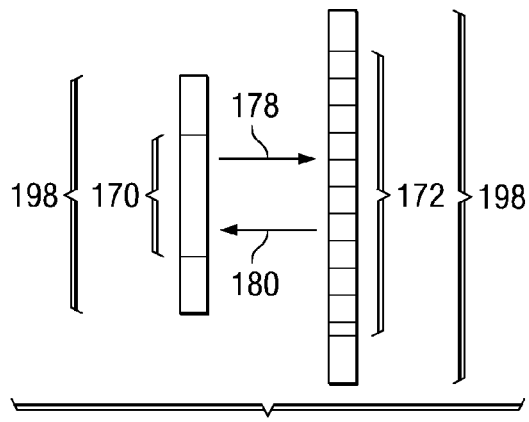
FIG. 4 illustrates various methods in the related art.

FIG. 4A illustrates the related art example of code rewriting and relocation. In particular, arrow 178 indicates a process by which a section of original code without instrumentation 170 is converted to a section of code with instrumentation 172. In such a process, an instrumented code 172 is generated from the original code 170, and the instrumented code 172 replaces the original code 170 within an application code 198. Arrow 180 indicates a process by which the original code 170 is recovered from the instrumented code 172. As shown, the process of code rewriting and relocation results in code expansion. Code expansion may result in increased runtime overhead, which may further result in the application running differently and/or more slowly, degrading performance, and thus potentially affecting analysis of the results of the code instrumentation. In some situations, code expansion may further result in application timeouts.

Figure 4B:
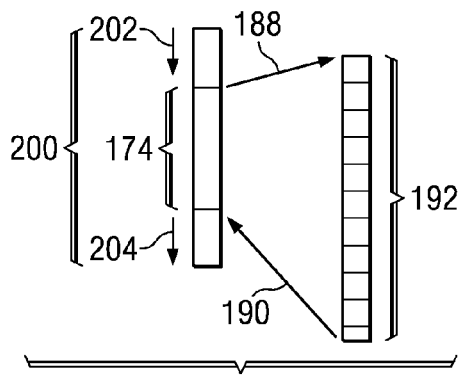

FIG. 4B shows another related art example of creating an instrumented code 192 from an original code 174, and modifying the JVM interpretation loop, as indicated by arrows 188 and 190. For the purposes of this disclosure, "interpretation" comprises the processes of fetching and decoding instructions. When an application code 200, executing in the direction indicated by arrow 202, encounters the original code 174, a modified JVM interpretation loop redirects execution to instrumented code 192 as indicated by arrow 188. After execution of the instrumented code 192, execution is once again redirected, as indicated by arrow 190, to the application code 200, and execution of the application code 200 continues in the direction indicated by arrow 204. Stated otherwise, the original code 174 remains unchanged, but when the JVM encounters the original code 174, execution is redirected to an instrumented code 192 (being an instrumented version of the original code 174). Once execution of the instrumented code 192 is complete, the JVM redirects the process to application code 200, after the original code 174. This approach to code instrumentation, as illustrated in FIG. 4B, also results in code expansion. Furthermore, modification of the JVM interpretation loop results in context switching, which is often computationally intensive and thus increases runtime overhead.

Figure 5:
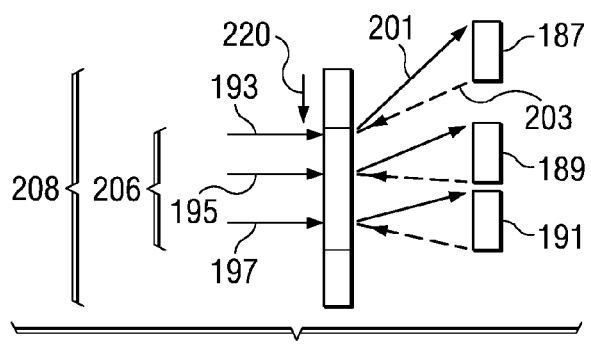
FIG. 5 illustrates a method utilizing software monitoring handlers in accordance with embodiments of the invention.

FIG. 5 illustrates embodiments of the present invention for code instrumentation that are not subject to code expansion and/or context switching, and thus are more efficient. In particular, FIG. 5 shows an application code 208 comprising an original code 206 and software monitoring handlers 187, 189, and 191. The software monitoring handlers comprise micro-sequences (i.e., C-ISA instructions) stored within the instruction storage 130 (as discussed above) or within the JEK 116, where each micro-sequence performs a specific monitoring task (i.e., instrumentation), such as DAC hotspot detection. The original code 206 remains unchanged whether or not it is executing with instrumentation. The software monitoring handlers are provided by the JEK 116 (FIG. 1) running on the JSM 102 (FIG. 1). Specifically, the JEK 116 may use a JSM hardware instruction (i.e., a hardware interrupt) to set values to monitor (i.e., monitor values, that correspond to specific program counter values) and to set entry points for the corresponding software monitoring handlers. As such, the JSM hardware instruction is used to associate the monitor values to the software monitoring handlers. In some embodiments, the monitor values may be set or unset dynamically at any time during execution of the application code 208. In other embodiments, the monitor values may be set or unset prior to execution of the application code 208. In yet other embodiments, the monitor values may set and the JEK 116 may engage or disengage some or all of the monitor values according to instrumentation needs. As an example of instrumented code, the application code 208 executing in a direction indicated by arrow 220 may encounter the original code 206 having monitor values corresponding to specific program counter ("PC") values (e.g., such as schematically indicated by arrows 193, 195, and 197).

As previously described, the JSM 102 implements two program counters—the PC (register R4) and the micro-PC (register R12). In accordance with some embodiments, only one of these two program counters is an active program counter used to fetch and decode instructions at any one time. Further, the active program counter may be used to trigger the software monitoring handlers. In particular, when the PC stored in register R4 is the active program counter and a PC value equal to a monitor value is encountered, the associated software monitoring handler (comprising a micro-sequence) is executed. In some embodiments, other registers having other values such as registers R0-R15 as illustrated in FIG. 3 (e.g., micro-program counter register, general purpose registers, etc.) may be used to trigger the software monitoring handlers to enable other kinds of code monitoring.

By way of example, and for the purposes of this disclosure, the "monitor value at a location indicated by arrow 193" may be referred to as the "monitor value 193". Thus, as shown in FIG. 5, the monitor value 193 is associated with the software monitoring handler 187, the monitor value 195 is associated with the software monitoring handler 189, and the monitor value 197 is associated with the software monitoring handler 191. As previously discussed, the JEK 116 uses the JSM hardware instruction to associate the monitor values to the software monitoring handlers in order to instrument the original code 206. During code execution, each time the JSM 102 reaches a monitor value, the JSM executes the corresponding JEK software monitoring handler. For example, when the application code 208 executing in a direction indicated by arrow 220 reaches the monitor value 193 (i.e., a PC value stored in register R4 equal to the monitor value 193 is detected), execution of the original code 206 is temporarily suspended while the software monitoring handler 187 is executed, as indicated by arrow 201. After execution of the software monitoring handler 187, execution of the original code 206 resumes at the same PC value where execution was previously suspended, as indicated by arrow 203. In some embodiments, an instruction corresponding to the detected PC value stored in register R4 may be executed prior to execution of the software monitoring handler. In such a case, execution of the original code 206 may resume at a PC value immediately following the detected PC value that triggered execution of the software monitoring handler.

Figure 6:
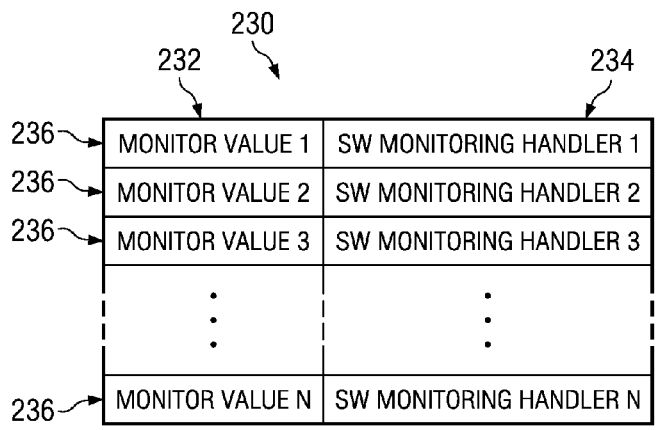
FIG. 6 shows a table in accordance with embodiments of the invention.

Each monitor value corresponds to a specific PC value and is associated with a specific software monitoring handler. The associations between the monitor values and the software monitoring handlers may be managed by a table 230 such as shown in FIG. 6. The table 230 may be implemented in the decode logic 152, as separate logic in the JSM 102, or as software within the JEK 116. Furthermore, in some embodiments, the JEK 116 may dynamically overwrite associations stored in the table 230 with new associations, thus allowing any of the available software monitoring handlers to be triggered by any monitor value (and thus by any PC value) that is encountered. The table 230 comprises a plurality of entries 236. The entries 236 may comprise one entry for each monitor value. For example, if there are a total of 10 monitor values, the table 230 comprises at least 10 entries. Each entry 236 comprises at least two fields—a field 232 and an associated field 234. Field 232 may comprise a monitor value corresponding to a specific PC value, and the associated field 234 may contain a reference to a micro-sequence for a particular software monitoring handler that is triggered upon detection of a PC value equal to the monitor value.

The associated field 234 may comprise a full starting address in instruction storage 130 of the micro-sequence or a part of the starting address that can be concatenated with a base address that may be programmable in the JSM. In the former case, the associated field 234 may provide sufficient address bits to access the full memory space. In the latter case, a register within the JSM registers 140, or within a JSM configuration register accessible through an indirect addressing mechanism using the IRI register, is programmed to hold the base address and the associated field 234 may supply only the offset to access the start of the micro-sequence. Additionally, the JSM internal registers 140, and any other registers accessible by the JVP 118 or the MPU 104, may be modified by the JVM. This latter addressing technique may be used to reduce the number of bits needed within the associated field 234.

The software monitoring handlers may be triggered by a PC value when the PC stored in register R4 is the active PC and when the PC value is equal to a monitor value as defined in the table (as discussed above). The micro-program counter (register R12) temporarily becomes the active program counter instead of the program counter 160 (FIG. 2) during execution of the software monitoring handler. At this point, the JSM 102 begins fetching and decoding the instructions of the micro-sequence. The switch from PC to the micro-PC is effective immediately after a PC value equal to a monitor value is detected, thereby reducing the latency. However, in some embodiments, the instruction corresponding to the detected PC value may execute prior to switching from the PC to the micro-PC.

The software monitoring handler comprising the micro-sequence may end with a predetermined instruction called "RtuS" (return from micro-sequence) that indicates the end of the sequence. This C-ISA instruction causes a switch from the micro-PC (register R12) to the PC (register R4) upon completion of the micro-sequence. Thereafter, the PC points to the instruction at the PC value that previously triggered the software monitoring handler. In some embodiments, the PC may have been incremented or offset by some predetermined value during execution of the micro-sequence so that the PC may point to an alternative instruction for subsequent decoding.

Figure 7:
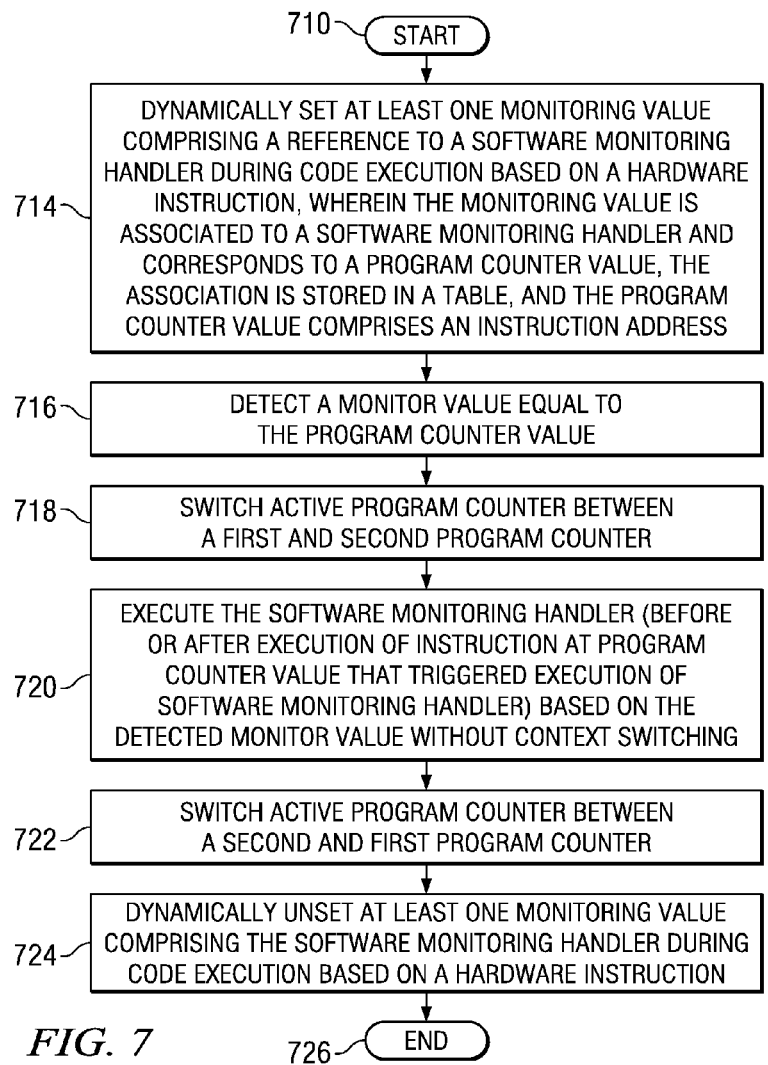
FIG. 7 shows a method in accordance with embodiments of the invention.

FIG. 7 illustrates a method (e.g., software) in accordance with some embodiments. In particular, the process starts (block 710) and proceeds to setting at least one monitor value during code execution based on a hardware instruction (block 714). The monitor value is associated with a software monitoring handler comprising a micro-sequence and corresponds to a specific program counter value. The association may be stored in a table, and the program counter value comprises an instruction addresses. In some embodiments, the monitor value may be set prior to code execution. Afterwards, a monitor value equal to the program counter value is detected (block 716). An active program counter is then switched between a first and a second program counter (block 718). In some embodiments, the second program counter may be the microprogram counter. The process then proceeds to execution of the software monitoring handler based on the monitor value detected in block 716 (block 720). Execution of the software monitoring handler may be performed before or after execution of the instruction at the program counter value that triggered execution of the software monitoring handler. Furthermore, execution of the software monitoring handler and execution of the instruction at the program counter value can be done within the same context. After the software monitoring handler has finished its execution, the active program counter is switched from the second to the first program counter (block 722), and the process ends (block 724).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   setting at least one monitor value, wherein the at least one monitor value is associated with a software monitoring handler; wherein the at least one monitor value indicates a location of an executable instruction of a first instruction set; wherein the software monitoring handler comprises instructions of a second instruction set and is to be executed in addition to the executable instruction;
   detecting a value within a register equal to the at least one monitor value;
   executing the software monitoring handler based on the detecting;
   executing the executable instruction; and
   overwriting at least one association in a table that associates the monitor value with the software monitoring handler.

2. The method according to claim 1 wherein, before overwriting, the monitor value is associated with the software monitoring handler by a portion of an address that can be concatenated with a base address to form a starting address of the software monitoring handler.

3. The method according to claim 1 wherein, before overwriting, the monitor value is associated with the software monitoring handler by an offset amount that can be added with a base address to form a starting address of the software monitoring handler.

4. The method according to claim 1 wherein overwriting is initiated by a hardware interrupt.

5. The method according to claim 1 wherein the overwriting causes the monitor value to be associated with a second software monitoring handler, the second software monitoring handler different from the software monitoring handler.

6. The method according to claim 1 wherein the detecting further comprises detecting an active program counter value equal to the at least one monitor value.

7. The method according to claim 1 wherein the setting further comprises setting the at least one monitor value based on a hardware instruction.

8. The method according to claim 1 wherein the setting further comprises setting the at least one monitor value, wherein the at least one monitor value is associated with an address of the software monitoring handler, and wherein the address designates a memory or register location.

9. The method according to claim 1 wherein the detecting further comprises detecting the value within the register being an address of an instruction, wherein the instruction is executed after the execution of the software monitoring handler.

10. The method according to claim 1 wherein the detecting further comprises detecting the value within the register being an address of an instruction, wherein the instruction is executed before the execution of the software monitoring handler.

11. The method according to claim 1 wherein the detecting further comprises detecting the value within the register being an address of an instruction, wherein the instruction and the software monitoring handler are both executed within the same context.

12. The method according to claim 1 further comprising programming a table to specify the association between the at least one monitor value and the software monitoring handler.

13. The method according to claim 12 wherein the programming further comprises programming the table, the table comprising a field and an associated field, wherein the field comprises the at least one monitor value, and wherein the associated field comprises a reference to a micro-sequence corresponding to the software monitoring handler.

14. A processor, comprising:
   fetch logic that retrieves instructions from memory;
   decode logic coupled to the fetch logic; and
   an active program counter comprising a value;
   wherein the processor monitors the active program counter value during execution of an application, and when the active program counter value reaches a predetermined value defining a location of a predetermined executable instruction of a first instruction set, the processor:
      executes a software monitoring handler comprising an instruction of a second instruction set in addition to execution of the executable instruction, and
      executes the executable instruction; and
   wherein the processor overwrites at least one association in a table that associates the predetermined value with the software monitoring handler.

15. The processor according to claim 14 wherein an instruction of the application is held in abeyance while the software monitoring handler is executed.

16. The processor according to claim 14 wherein the table comprises a field and an associated field, wherein the field comprises the predetermined value, and wherein the associated field comprises a reference to a micro-sequence corresponding to the software monitoring handler.

17. The processor according to claim 14 wherein the processor selectively sets the predetermined value during execution of the application.

* * * * *